R. E. BARB.
NUT LOCK.
APPLICATION FILED SEPT. 5, 1914.
1,147,595.
Patented July 20, 1915.
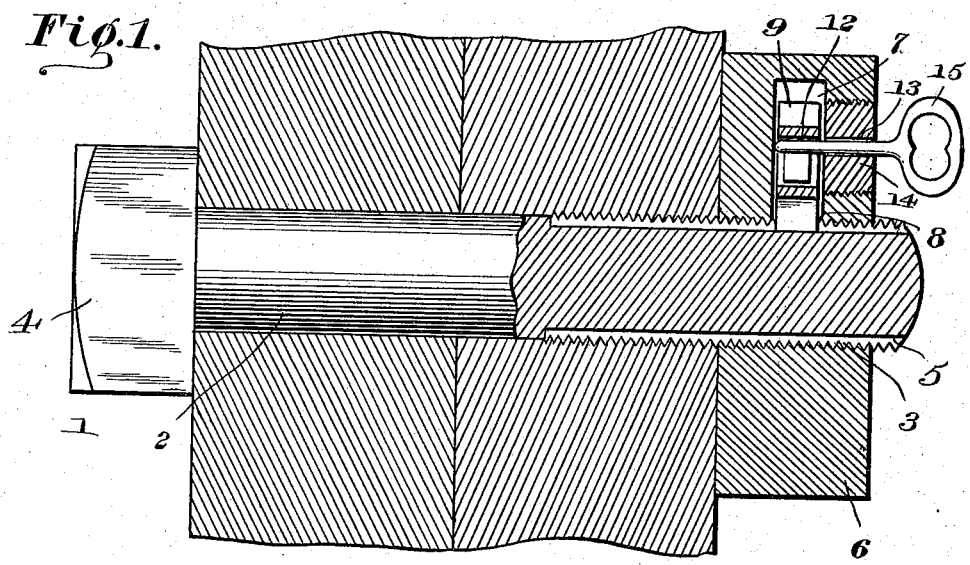
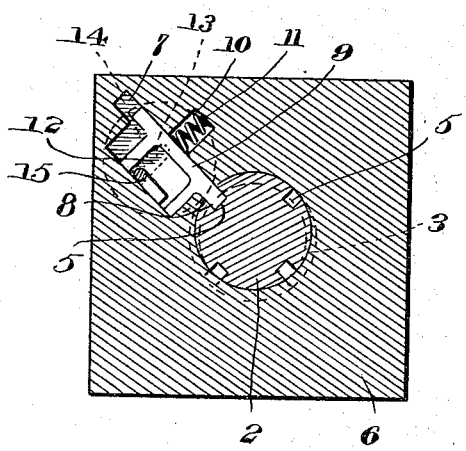
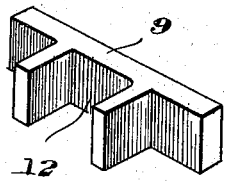
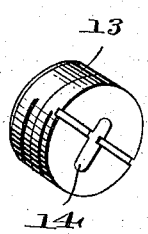
Witnesses
Frederick W. Ely.
John J. McCarthy
Inventor
Roy E. Barb,
By Victor J. Evans
Attorney

UNITED STATES PATENT OFFICE.

ROY E. BARB, OF KITZMILLER, MARYLAND.

NUT-LOCK.

1,147,595.  Specification of Letters Patent.  Patented July 20, 1915.

Application filed September 5, 1914. Serial No. 860,364.

*To all whom it may concern:*

Be it known that I, ROY E. BARB, a citizen of the United States, residing at Kitzmiller, in the county of Garrett and State of Maryland, have invented new and useful Improvements in Nut-Locks, of which the following is a specification.

This invention relates to certain novel and useful improvements in nut locks.

In carrying out the present invention, it is my purpose to improve and simplify the general construction of key operated nut locks and to provide a nut lock whereby the nut may be securely and effectively locked to the bolt against turning movement thereon.

With the above and other objects in view, the invention consists in the construction, combination and arrangement of parts hereinafter set forth in and falling within the scope of the claim.

In the accompanying drawing, Figure 1 is a longitudinal sectional view through a bolt and nut thereon equipped with a nut lock constructed in accordance with the present invention. Fig. 2 is a cross sectional view through the nut and bolt showing the mechanism of the lock in elevation. Fig. 3 is a perspective view of the locking dog removed from the nut. Fig. 4 is a perspective view of the plug.

Referring now to the drawing in detail, 1 designates a bolt comprising a shank 2 having one end threaded as at 3 and the opposite end provided with a head 4. Formed in the shank 2 of the bolt at the threaded end thereof are longitudinally extending grooves 5 spaced apart equal distances about the shank of the bolt.

6 designates a nut having formed therein a recess 7 disposed at one side of the threaded bore of the nut and formed in the wall of the recess 7 is an aperture 8 opening into the bore of the nut. Disposed within the recess 7 is a locking detent 9 having one end lying within the aperture 8 and capable of sliding movement into and out of the bore of the nut to engage the adjacent groove 5 in the bolt when the nut is threaded on the latter. Formed in the wall of the recess 7 at the back of the detent 9 is a depression 10 and disposed within the depression is a coiled expansion spring 11 having one end engaging the inner wall of the recess and the opposite end abutting the adjacent edge of the detent, and formed on the opposite edge of the detent are lugs projecting toward the confronting wall of the recess 7 and spaced apart to form a cavity 12 registering with a key slot 13 formed in a plug 14 threaded into the outer end of the recess 7 to close the latter.

Normally, the locking detent 9 is retracted from the bore of the nut and when the nut has been threaded onto the bolt to the required degree, the aperture 8 is brought into registration with one of the grooves 5. A key 15 is inserted in the key slot 13 and the lug on the key engages in the cavity 12 in the particular edge of the locking detent 9 and as the key is turned, the locking bolt is slid through the aperture 8 into the bore of the nut and the groove 5 in the bolt, thereby locking the nut to the bolt. In practice, the spring 11 holds the detent against accidental movement when in one or the other of its positions.

I claim:

In a nut lock, a bolt having a threaded end and provided with longitudinal grooves on the threaded portion thereof spaced apart about the bolt, a nut threaded onto the bolt and having a recess formed therein opening onto the outer face thereof and an aperture formed in the wall of the recess and opening into the bore of the nut, a detent within said recess having one end disposed within the aperture and adapted to be projected into the bore of the nut to engage the adjacent groove in the bolt, lugs on one side of said detent and projecting outwardly therefrom and spaced apart to form a cavity designed to receive a key so that the detent may be projected and retracted, a plug in the outer end of the recess closing the latter and formed with a key way registering with the cavity between the lugs on said detent, the wall of the recess in the nut being formed with a depression at the side of the detent opposite from the lugs, and a coiled expansion spring within said recess having one end engaging the inner wall of the recess and the opposite end abutting the adjacent edge of said detent to hold the latter in operated position.

In testimony whereof I affix my signature in presence of two witnesses.

ROY E. BARB.

Witnesses:
FRED D. KERNS,
A. L. BARB.